(12) United States Patent
Foerg et al.

(10) Patent No.: US 9,956,644 B2
(45) Date of Patent: May 1, 2018

(54) METHOD AND DEVICE FOR IMPROVING THE QUALITY OF THE WELD SEAM IN FRICTION STIR WELDING

(71) Applicant: Grenzebach Maschinenbau GmbH, Asbach-Baeumenheim (DE)

(72) Inventors: Johann Foerg, Kaisheim-Altisheim (DE); Martin Demharter, Augsburg (DE); Andreas Reitenauer, Wertingen (DE)

(73) Assignee: Grenzenbach Maschinenbau GmbH, Asbach-Baeumenhei (DE)

( * ) Notice: Subject to any disclaimer, the term of this patent is extended or adjusted under 35 U.S.C. 154(b) by 426 days.

(21) Appl. No.: 14/403,372

(22) PCT Filed: May 29, 2013

(86) PCT No.: PCT/DE2013/000293
§ 371 (c)(1),
(2) Date: Nov. 24, 2014

(87) PCT Pub. No.: WO2013/178215
PCT Pub. Date: Dec. 5, 2013

(65) Prior Publication Data
US 2015/0102087 A1      Apr. 16, 2015

(30) Foreign Application Priority Data
May 31, 2012  (DE) .................. 10 2012 010 836

(51) Int. Cl.
*B23K 20/12*      (2006.01)
(52) U.S. Cl.
CPC ........ *B23K 20/1225* (2013.01); *B23K 20/123* (2013.01); *B23K 20/125* (2013.01); *B23K 20/1255* (2013.01)

(58) Field of Classification Search
CPC ...................................... B23K 20/122–20/128
See application file for complete search history.

(56) References Cited

U.S. PATENT DOCUMENTS

| 6,497,355 | B1 | 12/2002 | Ding et al. |
| 6,742,697 | B2 | 6/2004 | McTernan et al. |
| (Continued) | | | |

FOREIGN PATENT DOCUMENTS

| DE | 10 2004 030 381 B3 | 1/2006 |
| DE | 10 2005 060178 A1 | 6/2007 |
| (Continued) | | |

*Primary Examiner* — Erin B Saad
*Assistant Examiner* — Carlos J Gamino
(74) *Attorney, Agent, or Firm* — Walter | Haverfield LLP; D. Peter Hochberg; Sean F. Mellino (57) ABSTRACT

A method and a device for improving the quality of the weld seam in friction stir welding is provided. The process of friction stir welding is effected by means of a friction welding tip, in which a spiral conveyor screw is provided in the spindle bearing. The longitudinal axis of the spindle bearing is inclined at an angle to the vertical. The sliding surface of the rotating spindle consists of a flat sliding surface and, for the welding of curved seams, in each case of a sliding surface inclined at an acute angle to the sliding surface, the friction welding tip is designed in the shape of a truncated cone. The lateral surface of the truncated cone is formed by six trapezoidal planar parts, of which three planar parts each uniformly distributed at the circumference lie at an angle of 120 degrees with respect to one another and account for a proportion greater than ⅙ at the circumference.

7 Claims, 6 Drawing Sheets

(56) References Cited

U.S. PATENT DOCUMENTS

| | | | |
|---|---|---|---|
| 7,837,082 B2 | 11/2010 | Christopherson, Jr. | |
| 7,909,225 B2 | 3/2011 | Henneboehle et al. | |
| 8,814,027 B2 | 8/2014 | Hori et al. | |
| 2002/0179682 A1* | 12/2002 | Schilling | B23K 20/1245 228/112.1 |
| 2007/0152015 A1 | 7/2007 | Burton et al. | |
| 2008/0149689 A1* | 6/2008 | Maziarz | B23K 20/1255 228/114.5 |
| 2008/0251571 A1* | 10/2008 | Burford | B23K 20/1255 228/114.5 |
| 2009/0123778 A1* | 5/2009 | Russell | B23K 20/1235 428/661 |
| 2013/0075452 A1* | 3/2013 | Burford | B23K 20/1255 228/2.1 |
| 2016/0346869 A1* | 12/2016 | Weigl | B23K 20/1265 |

FOREIGN PATENT DOCUMENTS

| | | | |
|---|---|---|---|
| DE | 603 10 020 T2 | 7/2007 | |
| DE | 10 2005 060 178 B4 | 4/2010 | |
| DE | 102014115535 B3 * | 3/2016 | ......... B23K 20/1255 |
| JP | 2009-538230 A | 11/2009 | |
| JP | 2011-79031 A | 4/2011 | |
| JP | 4838385 B2 | 12/2011 | |
| WO | WO 2007/006669 A1 | 1/2007 | |
| WO | WO 2007/140043 A2 | 12/2007 | |
| WO | WO 2011/024320 A1 | 3/2011 | |

\* cited by examiner

Fig. 4

METHOD AND DEVICE FOR IMPROVING THE QUALITY OF THE WELD SEAM IN FRICTION STIR WELDING

CROSS-REFERENCE TO RELATED APPLICATIONS

This application is a National Stage application of International Application No. PCT/DE2013/000293, filed on May 29, 2013, which claims priority of German application Serial Number 10 2012 010 836.2, filed on May 31, 2012, both of which are incorporated herein by reference in their entireties.

BACKGROUND OF THE INVENTION

Field of the Invention

The invention relates to an improvement in the quality of friction stirring tools in friction stir welding.

Description of the Prior Art

At the beginning of the nineties of the last century, friction stir welding was developed. In the meantime, friction stir welding is being successfully used among other things for the welding of aluminum alloys in many relevant areas of industry. The applications range here from one-off pieces and small batches through to larger batches. Apart from the outstanding quality of the weld seam, other factors contributing to the commercial success are the high degree of reproducibility and the little preparational work and expenditure on finishing. This method can be automated very well and allows quality monitoring on the basis of machine monitoring.

In friction stir welding, frictional heat is generated in the joining region of the materials to be connected by means of the friction between a rotating tool which at the same time is moved translationally and applied with pressure. The tool is moved along the joining region and stirs the plastified material in the interior of the seam of the materials to be connected that are butting against one another. The applied pressure presses the plastified material together. At the end of this seam, the tool is withdrawn from the region of the connection and the weld seam can be subjected to loading immediately.

DE 10 2004 030 381 B3 discloses a method for online quality testing in friction stir welding that is based on the object of being reliable and simple.

To achieve this object, it is claimed that a friction stirring tool is introduced under rotational movement and applied pressure into the material of workpieces to be welded and is guided along a joint of the workpieces to be welded, the application of pressure and/or the oscillations of the friction stirring tool that occur during the friction stir welding process, of the workpieces to be welded or of other elements that are excited by the welding process being measured over time and subsequently converted by means of a Fourier transform into frequency-amplitude spectra, and that the frequency-amplitude spectra determined are compared with reference values for testing the quality of the welded connection produced.

Furthermore, DE 603 10 020 T2 discloses a method for connecting structural components by means of friction welding with a connecting plug, in which a method for producing a structural assembly that comprises the following features is claimed.

Positioning a first structural element at least partially adjacent a second structural element to define an interface therebetween and inserting a rotating plug into the first and second structural elements at the interface to thereby form a friction plug welded connection that connects the first structural element to the second structural element, and after that the following feature is lastly claimed.

The forming of an elongate welded connection between the first and second structural elements along the interface, wherein the elongate weld joint at least partially consumes the plug.

Furthermore, WO 2007/006669 A1 discloses a friction stir welding tool and also a method and an assembly for the real-time control of a friction stir welding process by recording the forces of acceleration and/or oscillations at the tool body.

This invention is based on the object of providing a compact friction stir welding tool for universal application and also a method and an assembly for the real-time control of a friction stir welding process that succeed in optimizing the joining process in a simple and low-cost manner, so that it produces a joining weld that conforms to quality requirements without the need for subsequent finishing and minimizes the stress exerted on the friction stir welding installation.

This object is achieved with a friction stir welding tool consisting of a tool main body and a tool stirring stud with a shoulder and a pin, which according to claim 1 is characterized in that at least one sensor for recording the forces of acceleration acting on the tool main body is integrated in the tool main body.

The service life of the tool stirring tool is not taken into account in the known prior art.

SUMMARY OF THE PRESENT INVENTION

The present invention is therefore based on the object of increasing the service life of the tool stirring tool from about 2 hours to 15 hours and increasing the quality of the joining seam in such a way that no finishing at all is required.

This object is achieved by the device as claimed in claim 1, a device for improving the quality of the weld seam in friction stir welding with the following features:

a) a receiving plate (1) with a drive head (2) and a spindle bearing (4) for receiving a friction welding tip (9), wherein a transporting screw (6), which is machined in a spiral form in the spindle bearing (4), and serves for transporting away applied material that is not required, enters into openings (8) leading obliquely outward, b) the longitudinal axis (L) of the spindle bearing (4) is inclined with respect to the vertical (V) at an angle of 2.8 to 3.2 degrees, c) the sliding surface of the spindle bearing consists of a planar sliding surface (10) and, particularly for the welding of curved seams, of a respective sliding surface (11) which is itself curved, adjoins on two opposite sides and is inclined at an acute angle to the sliding surface (11), d) the friction welding tip (9) has the form of a truncated cone on which the top surface is raised in the middle, and wherein the lateral surface of the truncated cone is formed by six trapezoidal segments, of which three segments are respectively distributed uniformly on the circumference, lie at an angle of 120 degrees with respect to one another and account for a proportion greater than ⅙ of the circular circumference.

Claim 2:

The device as claimed in claim 1, wherein the inclination of the longitudinal axis of the spindle bearing (4), the inclination of the surfaces (11) and the pressing pressure of the sliding surface (10) are dimensioned in such a way that they are optimized for the welding of a thin metal sheet with a curved border at the sides to a shaped body designed in the form of a dish and bordered in the same way at the edges.

Claim 3:

The device as claimed in one of the preceding claims, wherein the pressing pressure of the sliding surfaces (10, 11) can be set, and the respective setting is measured and displayed.

Claim 4:

The device as claimed in one of the preceding claims, wherein means by which the pressing pressure can be set and for which the pressing pressure is monitored are used for fixing the components to be welded.

Claim 5:

The device as claimed in one of the preceding claims, wherein the result of the welding process is monitored optically.

Or the method as claimed in claim 6: a method for improving the quality of the weld seam in friction stir welding with the following features:

a) the process of friction stir welding is effected by means of a friction welding tip (9), in which a transporting screw (6), which is machined in a spiral form in the spindle bearing (4), serves for transporting away applied material that is not required, b) the longitudinal axis (L) of the spindle bearing (4) is inclined with respect to the vertical (V) at an angle of 2.8 to 3.2 degrees, c) the sliding surface of the spindle bearing consists of a planar sliding surface (10) and, for the welding of curved seams, of a respective sliding surface (11) which is itself curved, adjoins on two opposite sides and is inclined at an acute angle to the sliding surface (11), d) the friction welding tip (9) is designed in the form of a truncated cone on which the top surface is raised in the middle, wherein the lateral surface of the truncated cone is formed by six trapezoidal segments, of which three segments are respectively distributed uniformly on the circumference, lie at an angle of 120 degrees with respect to one another and account for a proportion greater than ⅙ of the circular circumference.

Claim 7:

The method as claimed in claim 6, wherein the pressing pressure of the sliding surfaces (10, 11) can be set, the respective setting is measured and displayed, and the welding process is consequently controlled.

Claim 8:

The method as claimed in claim 6 or 7, wherein the result of the welding process is monitored optically.

Claim 9: A computer program with a program code for carrying out the method steps as claimed in one of claims 6 to 8 when the program is run in a computer.

Claim 10:

A machine-readable carrier with the program code of a computer program for carrying out the method as claimed in one of claims 6 to 8 when the program is run in a computer.

BRIEF DESCRIPTION OF THE DRAWINGS

The device according to the invention is described in more detail below. In the figures specifically.

DETAILED DESCRIPTION OF THE PRESENT INVENTION

Figure 1:
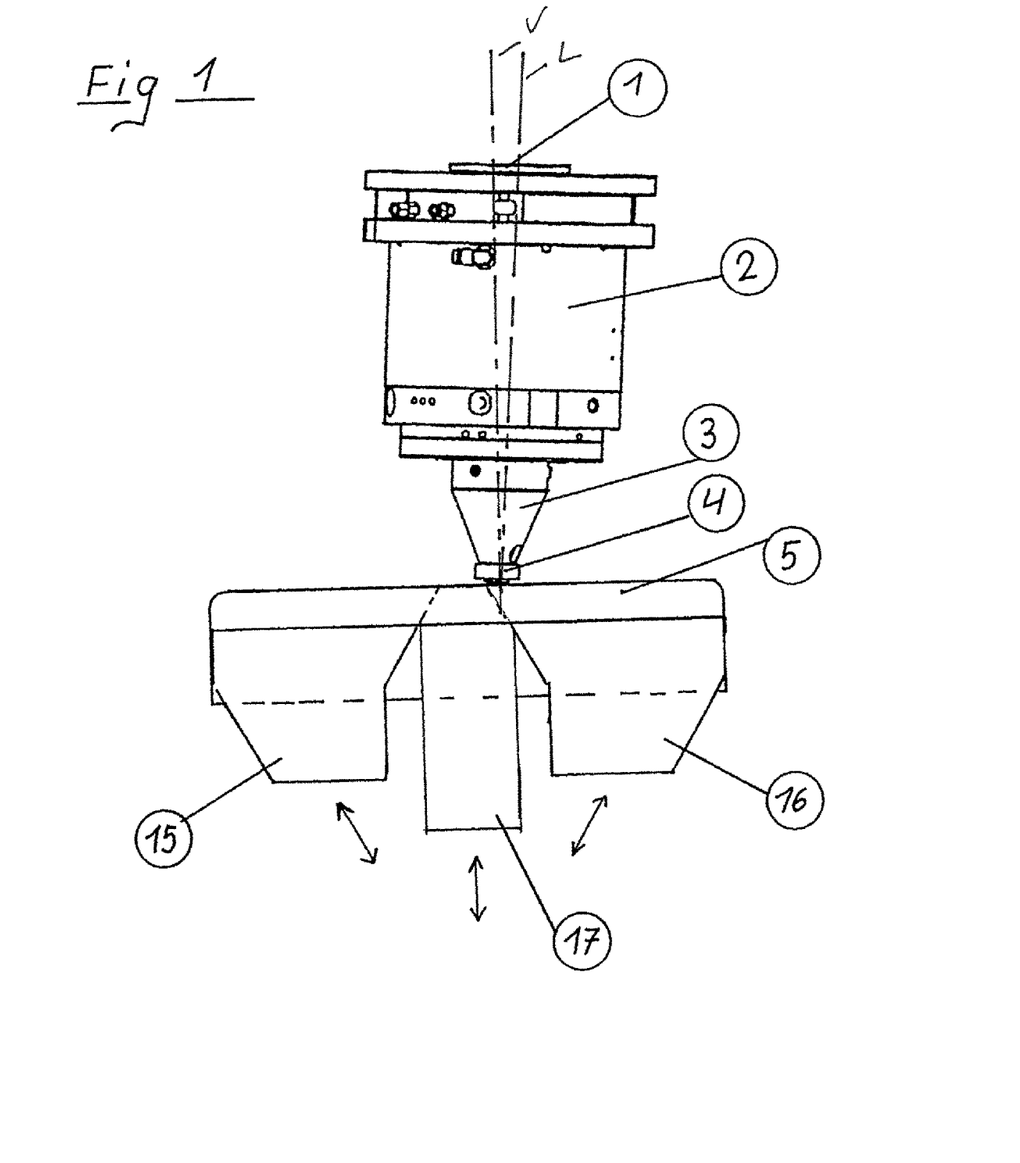
FIG. 1 shows a side view of the device according to the invention.

FIG. 1 shows a side view of the device according to the invention.

A receiving plate 1 connects a drive head 2 to a machine tool, for example a robot arm, which controls the entire movement sequence of the welding process. The drive head 2 has a holding cone 3, which serves for securing a spindle bearing 4.

In the case represented, the welded article 5 consists of a shaped body in the form of a dish, onto which a shaped sheet-metal part that has the same outer contour as the shaped body in the form of a dish is welded. For details, reference is made to FIG. 2 and FIG. 6.

Serving for securing the welded article in this case are the fixing jaws 15, 16 and 17. The double-headed arrows indicated show the directions of movement of these fixing jaws when clamping in the welded article 5 and releasing it after the welding process has been performed.

Figure 2:
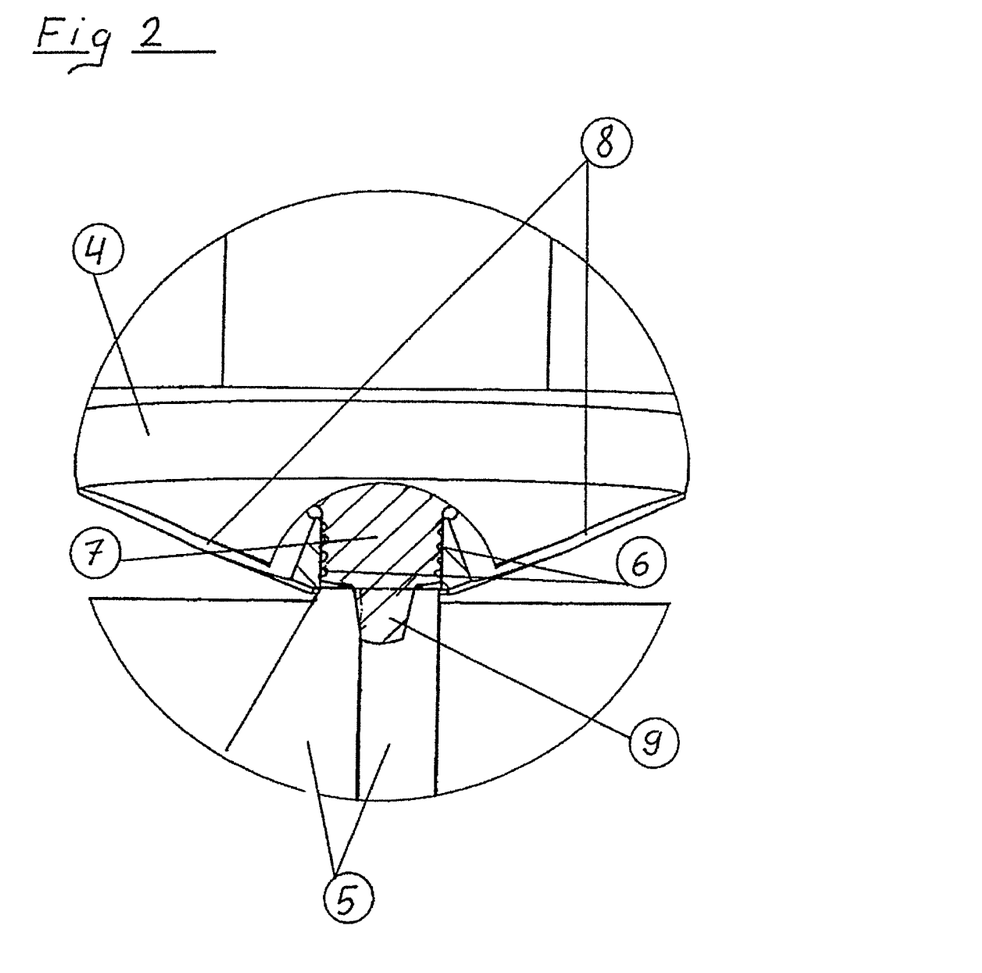
FIG. 2 shows a cross section from the region of the melting process.

FIG. 2 shows a cross section from the region of the melting process.

In the upper part of this figure, the lower part of the spindle bearing 4 is represented. The two indicating lines that concern the welded article 5 are pointing on the right-hand side to the shaped sheet-metal part mentioned in the description of FIG. 1. This shaped sheet-metal part can be seen here in an enlarged representation in cross section as a perpendicularly oriented sectional area. To the left of the delimiting line of the shaped sheet-metal part, in the cross section the shaped body in the form of a dish can be seen in cross section as an obliquely tapering sectional area.

In the center of the representation of FIG. 2, the lower part of the working tool 7 and of the friction welding tip 9 is shown in shaded form. Here it is clear that, by means of the heating of the welded article 5 that is caused by the rotation of the friction welding tip 9, the latter has for the most part entered the region of the shaped sheet-metal part and merely with its side edge heats the shaped body tangentially by friction.

In the peripheral region of the working tool 7 the depressions of the transporting screw 6, which can in this way be seen in cross section, can be seen on both sides. It is achieved by means of this transporting screw 6 that the applied material occurring during the welding process, which normally clogs the region around the transporting screw 6 and requires that the working tool is exchanged completely after an operating time of about 2 hours, is transported upwardly and emerges by way of the openings 8. In this way it is achieved according to the invention that the service life of the working tool is increased in a significant way.

Figure 3:
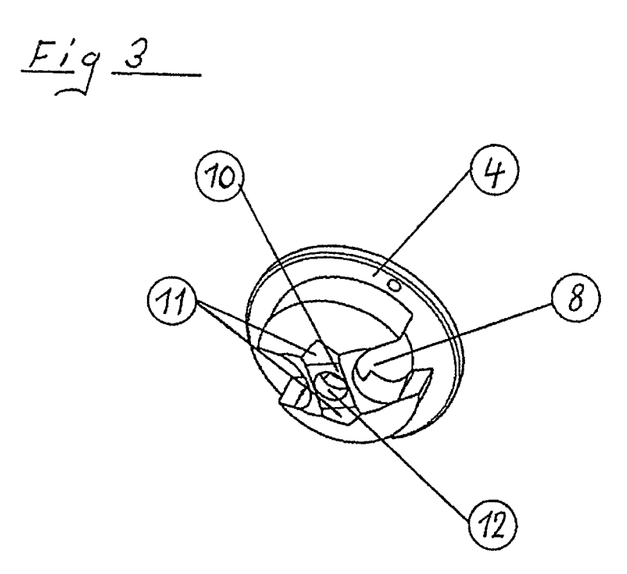
FIG. 3 shows a perspective view of the spindle bearing 4.

FIG. 3 shows a perspective view of the spindle bearing 4.

Apart from an opening 8 and the transporting screw bearing 12, here there can be seen in particular the sliding surface 10 by means of which the depth of entry of the friction welding tip 9 is limited. As a special feature, adjoining the sliding surface 10 on both sides there is in each case an inclined, itself curved sliding surface 11. This serves for facilitating the welding process generally and in the welding of curved shaped pieces.

Figure 4:
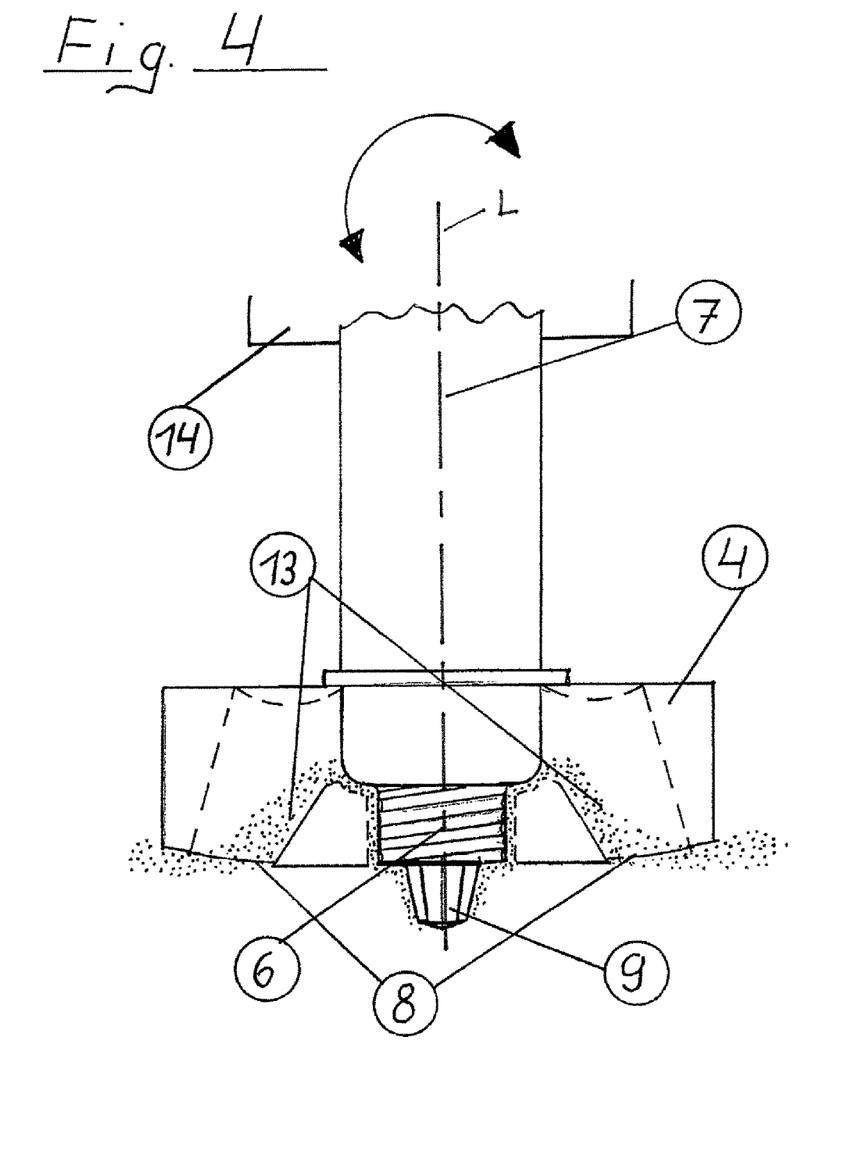
FIG. 4 shows a representation of the action of the transporting screw 6.

FIG. 4 shows a representation of the action of the transporting screw 6. On the one hand the working tool 7 and on the other hand, in the effective region thereof, the frictional welding tip 9 can be seen centrally here in cross section. Adjoining the friction welding tip 9, a transporting screw 6 is machined in the cylindrical attachment shown. The direction of rotation of this transporting screw 6 is chosen such that the applied material 13 occurring at the friction stirring tip is transported away upwardly by way of the pitch of the transporting screw 6 and later outwardly by way of the openings 8 in the tool holder 14. The direction of rotation of the transporting screw 6 may however also be chosen in the opposite sense, in order to be able to remove remains of the applied material 13 more easily after the welding process. The applied material 13 is depicted here as dispersed material shown in the form of points; it consists in practice of a continuous strand and is removed mechanically. In this way, soiling of the treated welded joint is largely prevented and the service life of the welding tool is increased from about 2 hours to as much as 15 hours.

To enhance this effect, in a particular embodiment ultrasound waves and/or means for suction removal may be additionally used.

Figure 5:
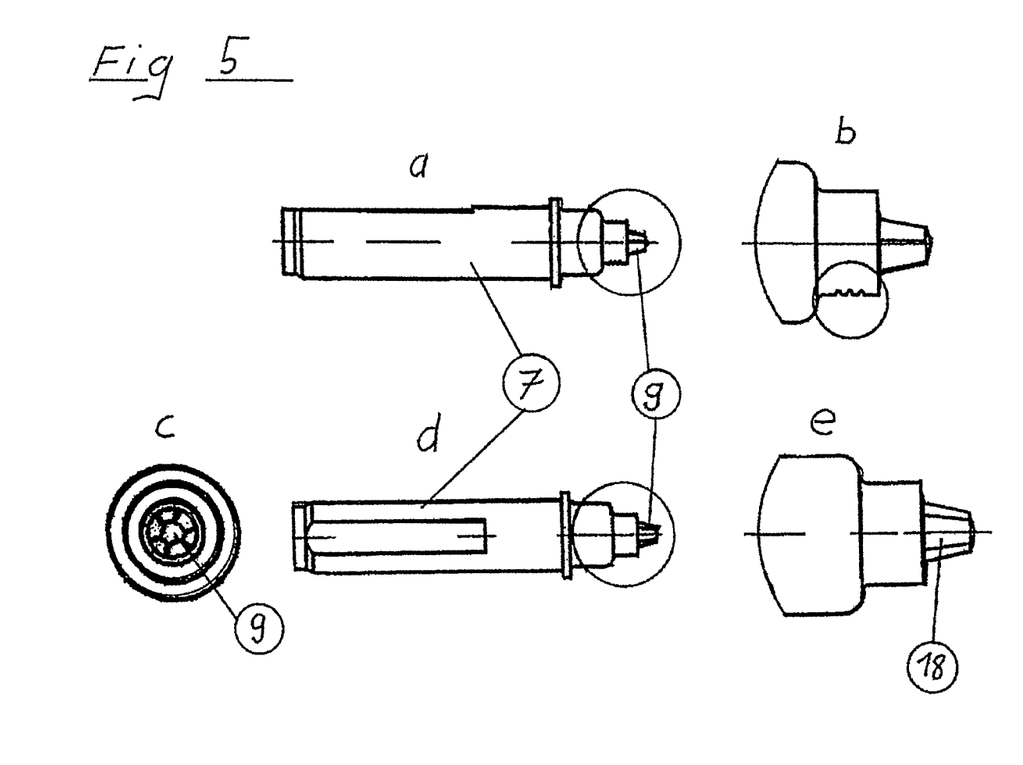
FIG. 5 shows detailed views of the working tool 7.

FIG. 5 shows more specific detailed views of the working tool 7. In part "a" of this figure, the working tool 7 is shown with the friction welding tip 9 in cross section. The encircled detail shown here is shown on its own and enlarged in part "b" of FIG. 5. In this representation, the depressions of the transporting screw 6 can then be seen at the edge of the working tool 7 in the encircled detail that is also shown.

In part "d" of FIG. 5, the working tool 7 is shown in cross section in a turned position. Associated with this is the partial view of FIG. 5 c, in which the friction welding tip 9 is shown from below, revealing well, in conjunction with the representation in FIG. 5 e, the configuration of the frictional surfaces 18 of the friction welding tip 9. The friction welding tip 9 has the form of a truncated cone, in which the top surface is raised in the middle. Here, the lateral surface of the truncated cone is formed by six trapezoidal segments, of which three segments are respectively distributed uniformly on the circumference, lie at an angle of 120 degrees with respect to one another and account for a proportion greater than ⅙ of the circular circumference. That is to say, larger and smaller trapezoidal segments alternate on the circumference of the truncated cone that forms the friction welding tip 9.

Figure 6:
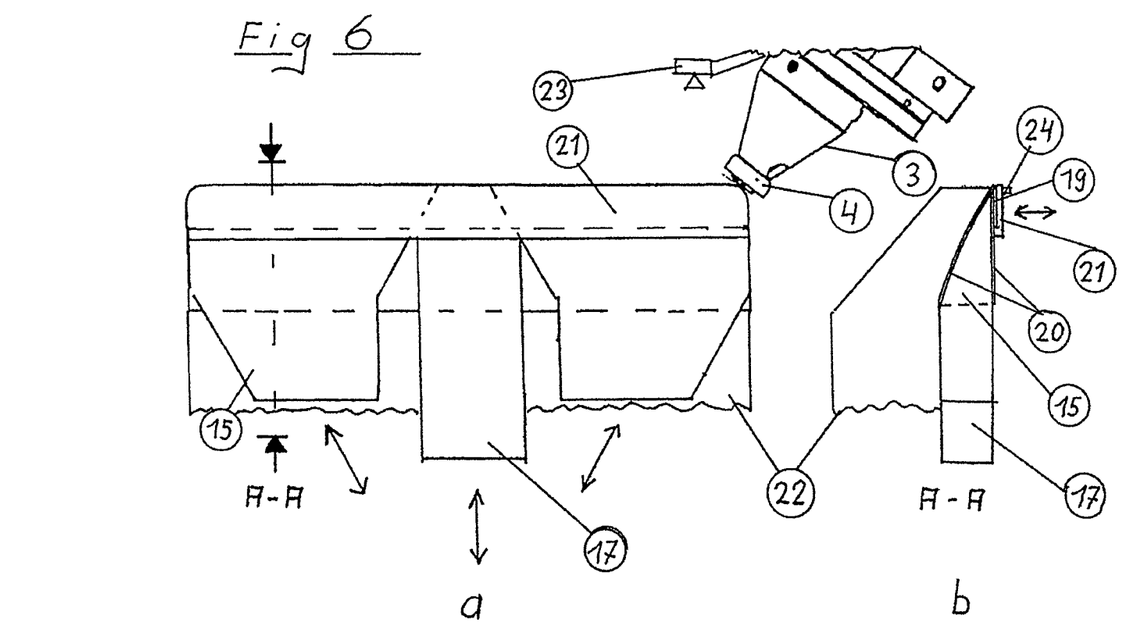
FIG. 6 shows a representation of a complex welding process.

FIG. 6 shows the representation of a complex welding process.

In this FIG. 6, it is demonstrated by the example of a specific welded article, with a shaped part to be welded in the form of a dish in which the side to be welded runs out flat, and a shaped metal sheet to be fastened thereupon, how the method according to the invention can be applied in welding processes on bent shaped parts.

In the left-hand part of FIG. 6, a device 22 for receiving a welded article 20 in the form of a dish is represented as viewed from the side. This welded article 20 is fixed in its position by means of a left-hand fixing jaw 15, a right-hand fixing jaw 16 and a middle fixing jaw 17, in such a way that it can be welded to a front plate 19. The respective double-headed arrows illustrate the paths of movement of the fixing elements 15, 16, 17 mentioned when clamping in and releasing the welded article 20. The welded article 19 in the form of a front plate 19 is fixed in its position to be welded by means of a fixing jaw 21, or in the case of longer welded seams a number of fixing jaws 21.

The section A-A depicted in FIG. 6 by dashed lines is shown on its own as a cross section on the right-hand side for purposes of illustration. Here it can be seen how the welded article in the form of the front plate 19 rests on the periphery of the welded article in the form of the dish 20 and is fixed in this position by means of one or more fixing jaws 21. For keeping a control check on the desired pressing pressure of the fixing jaws 21, one or more sensors 24 are provided.

To represent the welding method according to the invention, in the left-hand part of FIG. 6 a holding cone 3 with a spindle bearing 4 is shown in operation on the right-hand, arcuately extending welded joint.

The inclination of the longitudinal axis (L) of the spindle bearing 4 with respect to the vertical (V) (2.9 to 3.2 degrees), the inclination of the surfaces 11 and the pressing pressure of the sliding surface 10 are adapted to the specific requirements of the welding task described here.

A monitoring system 23, which may take the form of optical monitoring, serves for checking the quality of the weld seam produced. Monitoring of the exact position of the parts to be welded before the welding process is also envisaged according to the invention.

The complex control of the movement sequences described requires a specific control program.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A device for improving the quality of a weld seam in friction stir welding comprising:
    a) a receiving plate with a drive head and a spindle bearing for receiving a working tool,
        wherein the spindle bearing has openings leading obliquely outward and a sliding surface,
        wherein the working tool has a friction welding tip, which includes a raised middle section, and has a transporting screw, which is machined in a spiral form in the working tool, and
        wherein the transporting screw transports away applied material that is not required through the openings,
    b) wherein a longitudinal axis (L) of the spindle bearing is inclined with respect to a vertical (V) at an angle of 2.8 to 3.2 degrees,
    c) wherein the sliding surface of the spindle bearing consists of a planar sliding surface and two respective sliding surfaces, said respective sliding surfaces are for welding of curved seams, wherein said respective sliding surfaces are curved and adjoin the planar sliding surface on opposites sides thereof at a reflex angle to the planar sliding surface, and
    d) wherein the friction welding tip has a form of a truncated cone,
        wherein on top of the truncated cone is the raised in a middle section and a bottom of the truncated cone is in the shape of a circle, wherein a lateral surface of the truncated cone is formed by six trapezoidal segments, said six trapezoidal segments being distributed about a circumference of the circle, wherein the circle is concentric with the raised middle section, and wherein three of the trapezoidal segments are respectively distributed uniformly on the circumference of the circle, lie at an angle of 120 degrees with respect to one another, and account for a proportion greater than 1/6 of the circumference.

2. The device as claimed in claim 1, wherein a pressing pressure of the sliding surfaces can be set.

3. The device as claimed in claim 1, further comprising one or more sensors for sensing a pressing pressure on components to be welded.

4. The device as claimed in claim 1, further comprising an optical monitoring system.

5. A method for improving the quality of a weld seam in friction stir welding comprising the following steps:

a) effecting the friction stir welding by a device, the device comprising:

a receiving plate with a drive head and a spindle bearing for receiving a working tool, wherein the spindle bearing has openings leading obliquely outward and a sliding surface, wherein the working tool has a friction welding tip, which includes a raised middle section, and has a transporting screw, which is machined in a spiral form in the working tool, and wherein the transporting screw transports away applied material that is not required through the openings, the sliding surface of the spindle bearing consisting of a planar sliding surface and two respective sliding surfaces, said respective sliding surfaces are for welding of curved seams, wherein said respective sliding surfaces are curved and adjoin the planar sliding surface on opposites sides thereof at a reflex angle to the planar sliding surface, and wherein the friction welding tip has a form of a truncated cone, wherein on top of the truncated cone is the raised in a middle section and a bottom of the truncated cone is in the shape of a circle, wherein a lateral surface of the truncated cone is formed by six trapezoidal segments, said six trapezoidal segments being distributed about a circumference of the circle, wherein the circle is concentric with the raised middle section, and wherein three of the trapezoidal segments are respectively distributed uniformly on the circumference of the circle, lie at an angle of 120 degrees with respect to one another, and account for a proportion greater than 1/6 of the circumference, b) inclining a longitudinal axis (L) of the spindle bearing with respect to a vertical (V) at an angle of 2.8 to 3.2 degrees for the friction stir welding.

6. The method as claimed in claim 5, comprising a step of setting a pressing pressure of the sliding surfaces.

7. The method as claimed in claim 6, comprising a step of optically checking the weld seam.

* * * * *

UNITED STATES PATENT AND TRADEMARK OFFICE
CERTIFICATE OF CORRECTION

PATENT NO. : 9,956,644 B2
APPLICATION NO. : 14/403372
DATED : May 1, 2018
INVENTOR(S) : Johann Foerg et al.

It is certified that error appears in the above-identified patent and that said Letters Patent is hereby corrected as shown below:

On the Title Page

At item (73) Assignee, the second line:
"Asbach-Baeumenhei (DE)" should read -- Asbach-Baeumenheim (DE) --

Signed and Sealed this
Tenth Day of July, 2018

Andrei Iancu
*Director of the United States Patent and Trademark Office*